United States Patent [19]
Peyton

[11] Patent Number: 5,762,808
[45] Date of Patent: Jun. 9, 1998

[54] DESTRUCTION OF ELECTRON AFFINIC CONTAMINANTS DURING WATER TREATMENT USING FREE RADICAL PROCESSES

[75] Inventor: Gary Rodger Peyton, Champaign, Ill.

[73] Assignee: Research Corporation Technologies, Inc., Tucson, Ariz.

[21] Appl. No.: 437,334

[22] Filed: May 9, 1995

[51] Int. Cl.$^6$ .................... C02F 1/32; C02F 1/58
[52] U.S. Cl. .................. 210/748; 210/757; 210/759; 210/763; 210/908; 210/909
[58] Field of Search ................ 210/721, 748, 210/759, 757, 758, 763, 908, 909

[56] References Cited

U.S. PATENT DOCUMENTS

| | | | |
|---|---|---|---|
| 3,617,582 | 11/1971 | Lawes et al. | 210/759 |
| 4,861,484 | 8/1989 | Lichtin et al. | 210/759 |
| 4,966,715 | 10/1990 | Ahsan et al. | 210/759 |
| 5,104,550 | 4/1992 | Stevens et al. | 210/759 |
| 5,124,051 | 6/1992 | Bircher et al. | 210/759 |
| 5,156,748 | 10/1992 | Meunier et al. | 210/759 |
| 5,198,122 | 3/1993 | Koszalka et al. | 210/748 |
| 5,258,124 | 11/1993 | Bolton et al. | 210/759 |
| 5,393,394 | 2/1995 | Ikeda et al. | 210/748 |

OTHER PUBLICATIONS

H.W. Prengle, Jr., et al., "Ozone/UV process effective wastewater treatment", *Hydrocarbon Processing*, pp. 82–87 (1975).

J.R. Bolton et al., "Homogeneous Photodegradation of Pollutants in Contaminated Water: An Introduction", *Solarchem Environmental Systems*, pp. 1–18.

G.E. Adams et al., "Pulse Radiolysis Studies on the Oxidation of Organic Radicals in Aqueous Solution", *Trans. Farad. Soc.*, 63, pp. 2981–2987 (1969).

V. Jagannadham et al., "One–Electron Reduction of Nitrobenzenes by α–Hydroxylalkyl radicals via Addition/Elimination. An Example of Organic Inner–Sphere Electron Transfer Reaction", *J. Am. Chem. Soc.*, 106, pp. 6542–6551 (1984).

P. Wardman et al., "Oxygen Inhibition of Nitroreductase: Electron Transfer from Nitro Radical–Anions to Oxygen", *Biochem. Biophys. Res. Comm.*, 69, pp. 942–949 (1976).

K.D. Asmus et al., "Pulse Radiolytic Study of the Site of OH Radical Attack on Aliphatic Alcohols in Aqueous Solution", *J. Phys. Chem.*, 77, pp. 1218–1221 (1973).

Schwarzenbach R. P. et al., "Quinone and Iron Porphyrin Mediated Reduction of Nitroaromatic Compounds in Homogeneous Aqueous Solution", Environmental Science and Technology, Oct. 1990, vol. 24, No. 10, pp. 1566–1574.

*Primary Examiner*—Thomas G. Wyse
*Attorney, Agent, or Firm*—Scully, Scott, Murphy and Presser

[57] ABSTRACT

A process is provided for treating aqueous streams contaminated with electron affinic contaminants. Accordingly, these contaminants are removed by producing a reactive intermediate that is generated in-situ and then reacting the reactive intermediate thus produced with the electron affinic contaminant. The reactive intermediate is produced in the aqueous stream by maintaining low levels of oxygen in the stream and by providing a reducing radical precursor, such as an alcohol, to the aqueous stream.

32 Claims, 3 Drawing Sheets

DESTRUCTION OF ELECTRON AFFINIC CONTAMINANTS DURING WATER TREATMENT USING FREE RADICAL PROCESSES

The present subject matter was supported by a grant from the Department of Defense, Grant No. DACA-88-93-D-0018-06.

FIELD OF THE INVENTION

The present invention is directed to a process for treating aqueous streams which are contaminated with electron affinic contaminants that contain at least one electron-withdrawing substituent. Specifically, the present invention provides a process for removing such contaminants by forming a reactive intermediate which is generated in-situ and then reacting the reactive intermediate with the electron affinic contaminant. The reactive intermediate is produced in the aqueous stream in the present invention by maintaining low levels of oxygen in the stream and by ensuring that at least one reducing radical precursor is present in the stream. Under these conditions, electron affinic contaminants as well as other contaminants and by-products can be removed rapidly from the aqueous stream.

BACKGROUND OF THE INVENTION

In today's society, contaminated water, i.e., waste water or groundwater exists in ever increasing quantities. Recent environmental awareness and concerns have brought this problem to the attention of the public. Therefore, there is a great need to provide new and improved ways to reduce and/or eliminate virtually all types of contaminants from aqueous streams.

Many water treatment processes that are utilized in industry today generate hydroxyl radicals or other free radicals such as hydrogen atom and hydrated electron, to treat contaminated waste water and groundwaters. These free radical treatment processes work well under normal circumstances because the electrophilic free radicals generated in those processes have a high ability to convert the easily oxidizing contaminants to less toxic substances, and in some cases, to relatively harmless species such as organic carbon to carbon dioxide, nitrogen species to nitrates, and organohalogens to halide ions. Thus, the free radical treatment processes which are conducted in highly oxidizing conditions destroy parent contaminants that are easily oxidizing as well as subsequent by-products, so that it is often possible to completely eliminate or greatly reduce the severity of many contamination problems that exist in today's society.

Despite the previous success of free radical treatment processes, certain important classes of contaminants (referred to herein as electron affinic contaminants), such as nitro-containing compounds (e.g., ordnance and energetic compounds), halogenated compounds (such as $CCl_4$) and others containing electron-withdrawing substituents such as sulfonate, nitrile, carboxylate and the like, are more refractory to electrophilic free radical attack than are compounds not containing those substituents. As a consequence, in the presence of other reactive material in the contaminated water, the aforementioned electron affinic contaminants, which by their nature are not readily oxidized in electrophilic free radical treatment processes, do not compete well for the electrophilic hydroxyl radicals, resulting in low treatment efficiency. Therefore, very long reaction times and/or additional chemicals are normally required using prior art free radical treatment processes to destroy these unwanted electron affinic contaminants from the aqueous stream.

Although oxidative free radical treatment processes are not very effective for removing these electron affinic contaminants, they are very efficient for removing other easily oxidizing contaminants. Thus, many research groups have focused on developing improvements in this technology for eliminating the foregoing electron affinic contaminants from waste water and groundwater.

For example, U.S. Pat. No. 5,104,550 to Stevens et al. provides an improved oxidation or photooxidation process for treating an aqueous stream containing an organic oxidizing contaminant that does not have a substituent that is electron donating, i.e., an electron affinic compound, and at least one impurity selected from the group consisting of carbonate ion and bicarbonate ion. Specifically, the improvement disclosed in Stevens et al. involves adding a stoichiometric excess amount of a precipitation agent to precipitate the impurity and to increase the pH of the stream to a basic level; and then subjecting the basic aqueous stream to an oxidation process to oxidize the contaminant. This patent discloses the use of water soluble calcium salts, such as calcium hydroxide, as the precipitation agent.

U.S. Pat. No. 5,124,051 to Bircher et al. provides another improvement that has been recently advanced in the area of free radical treatment processes. Specifically, Bircher et al. provides a process for treating aqueous waste or groundwater contaminated with nitro-containing organic compounds such as dinitrotoluene or trinitrotoluene. The process disclosed in Bircher et al. comprises the steps of adjusting the pH of the aqueous waste or groundwater to a pH of greater than 10 to permit an effective amount of hydrolysis of that compound; and then treating the waste or groundwater with at least one hydroxyl radical generating agent comprising ozone in an effective amount sufficient to reduce the concentration of the compound in the waste water or groundwater to a desired level.

U.S. Pat. No. 5,258,124 to Bolton et al. provides another alternative process for treating aqueous waste water or groundwater containing organic contaminants degradable by hydrated electrons. Specifically, the process disclosed in Bolton et al. comprises contacting the aqueous waste water or groundwater with an agent which generates hydrated electrons on photolysis; and irradiating the aqueous waste water or groundwater with ultraviolet light to photolyze the hydrated electron generating agent, thereby generating hydrated electrons to degrade the contaminant. Suitable hydrated electron generating agents employed in Bolton et al. include, for example, iodide, hydroxide or bromide ions.

Despite the current state in the art there still exists a need for providing improved and more efficient free radical treatment processes that have the ability to remove electron affinic contaminants in a relatively high amount as well as other non-electron affinic contaminants from waste water and groundwater containing the same.

SUMMARY OF THE PRESENT INVENTION

The present invention is directed to a process for treating aqueous streams, i.e., waste water as well as groundwater, that contain electron affinic contaminants therein. The treatment process of the instant invention ultimately results in the elimination of electron affinic contaminants from the aqueous stream by reduction of the contaminant to a less toxic substance. The term "electron affinic contaminant" is used herein to denote contaminants that are difficult to oxidize under normal free radical treatment conditions, but they will readily accept an electron or undergo a process that results in a transfer of an electron to the contaminant. The term also is meant to include difficult to oxidize by-products that are formed from easily oxidized contaminants.

Such electron affinic contaminants are well known to those skilled in the art, and generally they contain at least one electron-withdrawing substituent. Illustrative examples of such contaminants include, but are not limited to, carbon tetrachloride, dinitrobenzene, dinitrotoluene, trinitrotoluene, tetrachloroethane, polychlorinated or polybrominated biphenyls and the like.

Specifically, the process of the instant invention comprises (1) providing an aqueous stream containing, as essential components, (a) at least one electron affinic contaminant; and (b) at least one reducing radical precursor which preferentially competes with other components present in the aqueous stream for electrophilic free radicals including that formed in step (2); and (2) generating an electrophilic free radical which is capable of reacting with the reducing radical precursor to produce a reactive intermediate; i.e., a reducing radical, while maintaining the oxygen content of the stream at zero or at no higher than a relatively low concentration which is insufficient to permit reaction of said oxygen with said reactive intermediate, thereby inducing the reaction of the reactive intermediate with the electron affinic contaminant to produce a reduced product which may be less toxic than the original contaminant.

The inventive process of the present invention increases the efficiency and therefore the cost-effectiveness of prior art free radical treatment processes for destroying electron affinic contaminants that are refractive to hydroxyl or other oxidizing free radicals. Moreover, unlike prior art processes in which an additive is simply photolyzed to yield an electron, in the present invention reduction of the electron affinic contaminant may take place in the same solution in which other components and contaminants are concurrently being oxidized. Furthermore, the process of the instant invention represents a dramatic improvement over prior art processes in that it results in more efficient removal of the electron affinic contaminants from aqueous streams which is achieved through the greater selectivity of the reactive intermediate for the electron affinic contaminant.

BRIEF DESCRIPTION OF THE DRAWINGS

FIG. 2 illustrates the destruction of dinitrotoluene (DNT) in water at various concentrations of oxygen using a $H_2O_2$/UV free radical treatment process. In FIG. 2, O denotes an oxygen concentration of 25.3 mg/L; ▼ denotes an oxygen concentration of 12.5 mg/L; ♦ denotes an oxygen concentration of 9.9 mg/L; ■ denotes an oxygen concentration of 2.5 mg/L; ▲ denotes an oxygen concentration of 1.0 mg/L; and ● denotes an oxygen concentration of 0.2 mg/L.

DETAILED DESCRIPTION OF THE INVENTION

As stated hereinabove, the present invention relates to a process for treating aqueous streams that contain at least one contaminant which is electron affinic in nature. Specifically, the present invention comprises providing an aqueous stream which contains, as essential components, at least one electron affinic contaminant; an effective amount of at least one electrophilic free radical, which is generated in-situ in the present invention, sufficient to produce a highly oxidizing environment; and at least one reducing radical precursor which successfully competes with other components in the aqueous stream for the electrophilic free radical, the amounts being such that the reducing radical precursor and the electrophilic free radical react thereby forming a reactive intermediate (reducing radical) in-situ.

In accordance with the present invention, the aqueous stream may or may not contain oxygen. If oxygen is present in the stream the amount of oxygen is at most a relatively low amount that is insufficient to permit reaction of oxygen with the reactive intermediate. Accordingly, under these conditions the reactive intermediate has an improved chance to react with the electron affinic contaminant to produce a reduced species that is less toxic than the original contaminant present in the aqueous stream.

The term aqueous stream as used herein includes aqueous media such as drinking water, bathing water, above and underground water from, for example, lakes, rivers and streams, as well as waste water from industrial plants, refineries, and etc. In a highly preferred embodiment, the aqueous stream is ground water.

Also within the scope of the present invention, are aqueous streams which contain contaminants as a result of the water having been used to extract or dissolve one or more contaminants from another product, or from another stream. One example is water which has been used to extract contaminants such as CFC's from other media such as contaminated soil and/or contaminated oil.

In accordance with the present invention, the aqueous stream contains at least one electron affinic contaminant. The term electron affinic contaminant, as stated above, denotes contaminants that are difficult to oxidize even in highly oxidizing environments which are normally present when free radical treatment processes are employed. Such contaminants may be inorganic compounds or organic compounds which contain at least one electron-withdrawing substituent. Mixtures of these inorganic and organic compounds may also be present in the aqueous stream. In a preferred embodiment of the present invention, the electron affinic contaminant is an organic compound that contains at least one electron-withdrawing group.

Illustrative examples of suitable electron withdrawing substituents include, but are not limited to, nitro, halide, sulfonate, carboxylate, nitrile, nitroso, nitrate esters, carboxylic esters, nitrite esters, carbonyls and quaternary ammonium groups. Of these substituents, nitro and halide substituents are highly preferred in the present invention.

Exemplary electron affinic contaminants that contain nitro substituents which can be present in the aqueous stream include, but are not limited to, dinitrotoluene, trinitrotoluene, dinitrobenzene, trinitrobenzene, the explosives RDX and HMX, nitrobiphenyls and the like. Of the aforementioned nitro-containing contaminants, dinitrotoluene (DNT), trinitrotoluene (TNT), and trinitrobenzene are particularly preferred in the present invention.

It should be noted that under normal free radical treatment process conditions TNT is converted to trinitrobenzene which is difficult to oxidize. However, in the present invention that by-product is rapidly reduced.

Specific types of electron affinic contaminants that contain a halide substituent that may be present in the aqueous stream are the well known halogenated organic contaminants. This includes the saturated halogenated aliphatic compounds, the unsaturated halogenated aliphatic or aromatic compounds, polychlorinated biphenyl (PCB's), polybrominated biphenyls, halogenated dioxins, such as 2,3,7,8-tetrachlorodibenzodioxin, and furans, and pesticides which contain at least one halogen, preferably chlorine, atom in its structure, and drinking water disinfection by-products which contain at least one halogen, preferably chlorine, atom in its structure.

The term unsaturated halogenated aliphatic or aromatic hydrocarbon compound is meant to denote open-chain compounds and those cyclic compounds that contain multiple carbon-carbon bonds. The unsaturated halogenated compounds which may be present in the aqueous stream and reduced by the process of the instant invention contain at least one multiple bond (double or triple) and at least one halogen atom substituent.

Examples of unsaturated halogenated compounds that may be found as contaminants in the aqueous stream include but are not limited to 1,1,2-trichloroethylene, 1,2-dichloroethylene, perchloroethylene, chlorinated phenols, 1,1-dichloroethene, trans-1,2-dichloroethene, cis and trans-1,3-dichloropropene, vinyl chloride, 1,1,2-tribromoethylene, 1,2-dibromoethylene, brominated phenols, 1,1-dibromoethane and the like.

The term saturated halogenated aliphatic compound is used herein to denote open-chain compounds or cyclic compounds that resemble open-chain compounds. Suitable saturated halogenated aliphatic hydrocarbon compounds that may be present in the aqueous stream as contaminants include carbon tetrachloride, dichloromethane, chloroform, bromodichloromethane, chloroethane, dibromochloromethane, dichlorodifluoromethane, 1,1-dichloroethane, 1,2-dichloroethane, 1,2-dichloropropane, 1,1,2,2-tetrachloroethane, 1,1,1-trichloroethane, trichlorofluoromethane, carbon tetrabromide, dibromomethane, bromoethane, 1,1-dibromoethane, 1,2-dibromoethane and the like.

The polychlorinated biphenyl (PCB) compounds and the polybrominated compounds which can be reduced by the process of the present invention are well known to those skilled in this art. These compounds normally are mixtures of isomers of polyhalogenated biphenyls. For example, the majority of PCB's are mixtures of isomers of trichlorobiphenyl, tetrachlorobiphenyl, pentachlorobiphenyl, and small amounts of dichlorobiphenyl and hexachlorobiphenyl.

Suitable halogen-containing pesticides that can be present in the aqueous stream and thus reduced by the inventive process include 1,1,1-trichloro-2,2-bis(p-chlorophenyl) ethane (DDT); 1,1,-dichloro-2,2-bis(p-chlorophenyl) ethane (DDD); 1,1-dichloro-2,2-bis(p-chlorophenyl) ethene; 2,2-bis(p-methoxyphenyl)-1,1,1-trichloroethane; O,O-bis(p-chlorophenyl) acetimidoylphosphoramidothioate; 2,4-dichlorophenyl p-nitrophenyl ether; α,α-bis(p-chlorophenyl)-3-pyridine methanol; 1,1-dichloro-2,2-bis(p-ethylphenyl) ethane; O-(4-bromo-2,5-dichlorophenyl); O-methylphenylphosphorothioate; 4'-chlorophenyl-2,4,5-trichlorophenyl sulfone; decachlorooctahydro-1,3,4-metheno-2-H-cyclobuta[cd]pentalene-2-one; 1,2,3,4,5,6-hexachlorocyclohexane; dodecachloroctahydro-1,3,4-metheno-1H-cyclobuta[cd]-pentalene; 1,2-dibromo-2,2-dichloroethyldimethyl phosphate; O,O-dimethyl-O-(2,4,5-trichlorophenyl) phosphorothioate; 4-tert-butyl-2-chlorophenyl-O-methyl methylphosphoroamidate; S-(2-chloro-phthalimido-ethyl) O,O-diethyl phosphorodithioate; chlorinated camphene; S-[[pchlorophenyl)thio]methyl] O,O-diethyl phosphorodithioate; 0-[2-chloro-1-(2,5-dichlorophenyl)-vinyl] O,O-diethyl phosphorothioate; 1,2,3,4,10,10-hexachloro-1,4,4a,5,8,8a-hexahydro-1,4-endo-exo-5,8-dimethanonaphthalene; O,O-diethyl-O-(3,5,6-trichloro-2-pyridyl) phosphorothioate; O,O-dimethyl(2,2,2-trichloro-1-hydroxylethyl)phosphonate; 6,7,8,9,10,10-hexachloro-1,5,5a,6,9,9a-hexahydro-6,9-methano-2,4,3-benzodioxathiepin-3-oxide; 1,2,3,4,10,10-hexachloro-6,7-epoxy-1,4,4a,5,6,7,8,8a-octahydro-1,4-endo-endo-5,8-dimethanonaphthalene and the like.

The drinking water disinfection by-products that may be present in the aqueous stream, include trihalomethanes, haloacetic acids, haloacetonitriles and the like. These by-products are generally present in relative low amounts in drinking water.

Exemplary trihalomethanes that may be present in the aqueous stream include trichloromethane, tribromomethane and the like. Suitable haloacetic acids and haloacetonitriles that may be present in the stream are chloroacetic acid, dichloroacetic acid, trichloroacetic acid, bromoacetic acid, dibromoacetic acid, tribromoacetic acid, chloroacetonitrile, dichloroacetonitrile, trichloroacetonitrile, bromoacetonitrile, dibromoacetonitrile, tribromoacetonitrile and the like.

The concentration of the electron affinic contaminants initially present in the aqueous stream may vary depending upon how contaminated the aqueous stream is. Typically, for example, drinking water contains very low amounts of the electron affinic contaminants. On the other hand, industrial waste water may have a much higher concentration of these contaminants therein.

It should be emphasized that other contaminants that are easily oxidized by free radical processes can also be present in the aqueous stream. Such contaminants are well known in the art and have been successfully eliminated from waste water and groundwater by utilizing prior art free radical treatment processes.

Also, present in the aqueous stream of the instant invention is an effective amount of electrophilic free radicals which are sufficient to produce a highly oxidizing environment. By highly oxidizing environment it is meant that within the aqueous stream free radicals are generated rapidly enough to cause significant oxidation of the contaminants to organic compounds. Such an environment is well known to those skilled in this art.

The electrophilic free radicals in the aqueous stream of the present invention are produced from conventional free radical treatment processes that are also well known to those skilled in the art. The free radicals are generated in-situ during the process of the instant invention. Specific examples of such free radical treatment processes that can be used in the instant invention to generate the electrophilic free radicals include, but are not limited to, treatment of the aqueous stream with ozone or binary or ternary combinations of ozone ($O_3$), hydrogen peroxide ($H_2O_2$), and ultraviolet (UV) light; semiconductor-catalyzed photooxidation; treatment by ionizing radiation such as electron beams, gamma rays or photo-Fenton's variants; Fenton's reagent variants ($Fe^{+2}+H_2O_2 \rightarrow Fe^{3+}+OH^-+.OH$); sonication/cavitation; and thermal, radiation, or photochemical decomposition of peroxide, persulfate or other unstable compounds. Also, within the contemplation of the present invention are processes which generate free radicals by UV or vacuum UV photolysis of water or other compounds which upon such treatment generate free radicals.

In a highly useful embodiment of the present invention, the electrophilic free radicals are generated by treatment of the aqueous stream with $H_2O_2$ and UV light.

Illustrative types of electrophilic free radicals that may be generated in the aqueous stream in the instant process include hydroxyl radicals, hydrogen atoms and sulfate radicals. The most preferred electrophilic free radicals employed in the present process are hydroxyl radicals which, as stated above, are generated by all of the treating processes named above, including, in a preferred embodiment, treating the aqueous stream with $H_2O_2$ and UV light.

It should be noted that electrophilic free radicals generated by the foregoing processes aggressively attack virtually all types of organic contaminants that contain electron donating groups. Thus, those contaminants will be readily removed in the instant invention by oxidation. However, as stated above, electron affinic contaminants are refractory to such an attack and are thus difficult to remove under normal free radical treatment processing conditions.

To remove those difficult to oxidize contaminants from the aqueous stream, it has been determined that the aqueous stream must contain, in addition to the other components mentioned above, at least one reducing radical precursor which is present in a concentration which successfully competes with the other components in the aqueous stream for reaction with the electrophilic free radical. This competition is critical in the present invention since it allows for the production of a reactive intermediate which is essential for reducing the electron affinic contaminant, provided that the amount of oxygen in the aqueous stream is properly controlled as described herein.

The reducing radical precursor may be initially present in the aqueous stream as a contaminant itself or it can be added to the stream during the course of the present invention. In order to effect this competition, the reducing radical precursor must be present in the aqueous stream in a concentration of no less than about 0.01 mg/L. More preferably, the reducing radical precursor is present in a concentration of from about 0.1 to about 50,000 mg/L.

Suitable reducing radical precursors that can be utilized in the present invention include, but are not limited to, alcohols, aldehydes, formic acid and carbon dioxide. Inorganic salts of formic acid such as sodium formate are also contemplated herein. Of these reducing agents, alcohols are highly preferred.

When an alcohol is used as the reducing radical precursor, the alcohol can be any aliphatic or aromatic alcohol which contains from about 1 to about 8, preferably 1 to about 6 carbon atoms. Exemplary alcohols that can be used in the present invention are methanol, ethanol, n-butanol, pentanol, propanol, 3-methyl-2-butanol, benzylalcohol, phenol and the like thereof. In a highly useful embodiment of the instant invention, the reducing radical precursor is ethanol or methanol.

If an aldehyde is used as the reducing radical precursor, the aldehyde can be any aliphatic or aromatic aldehyde containing from about 1 to about 6, preferably 1 to about 3 carbon atoms. Suitable aldehydes contemplated herein include formaldehyde, acetaldehyde, propanal, n-butanal, pentanal, benzaldehyde and the like. Isomers of propanal, n-butanal and pentanal may also be used as the reducing radical precursor.

It should be noted that the use of formic acid or inorganic salts of formic acid as the reducing radical precursor is also highly preferred in the present invention since those compounds under the conditions employed herein are converted to carbon dioxide which may also be used as the deoxygenation agent.

Another requirement of the present invention is that oxygen which is normally present in the aqueous stream in high amounts be absent, or present in at most only a relatively low amount such that the oxygen cannot readily react with the reactive intermediate. By relatively low amount, it is meant that the aqueous stream contains a concentration of oxygen which is less than about 8 mg/L of the aqueous stream. Preferably, in the present invention, the aqueous stream contains a concentration of oxygen which ranges from about 0.1 to about 2 mg/L. Most preferably, the concentration of oxygen present in the aqueous stream should be maintained as low as is practically feasible.

When the amount of oxygen is maintained within the range specified above, the competition of oxygen for the reactive intermediate is lessened. Accordingly, under those conditions, the reactive intermediate rapidly reacts with the electron affinic contaminant by reduction.

It should be emphasized that if the oxygen concentration is above the range specified herein, there will be a strong competition for the reactive intermediate which will inhibit the desired reaction with the electron affinic contaminant. Moreover, rather than reducing the electron affinic contaminant, the reactive intermediate will rapidly react with oxygen.

In accordance with the present invention, the aqueous stream provided may already be deoxygenated prior to use in the present invention. In the event that the aqueous stream is not deoxygenated prior to being utilized in the present invention, the aqueous stream can be subjected to deoxygenation during the present process. In accordance with this embodiment, the oxygen-containing aqueous stream will be deoxygenated to lower the concentration of oxygen to the amount specified hereinabove. Deoxygenation is carried out in the present invention by using techniques that are well known to those skilled in the art.

Deoxygenation will be necessary in those embodiments wherein the aqueous stream has previously been subjected to oxidative treatment to oxidize other contaminants present therein or when oxygen is dissolved in the aqueous stream due to contacting the stream with air.

Specifically, deoxygenation of the aqueous stream may be carried out by chemically treating the aqueous stream with a deoxygenation agent examples of which are well known to those skilled in this art. Suitable deoxygenation agents that may be employed in the instant invention to lower the initial concentration of oxygen in the aqueous stream are sulfite and sulfur dioxide. It should also be emphasized herein that the reducing radical precursor itself may also serve as the deoxygenation agent. In such cases there is a sufficient amount of reducing radical precursor present in the aqueous stream to first lower the oxygen content and then react with the free radicals to produce the reactive intermediate.

In free radical processes which also generate hydrated electrons, carbon dioxide may be used as the deoxygenation agent and as the reducing radical precursor.

It should also be noted that where the aqueous stream is anoxic further deoxygenation may or may not be necessary and the aqueous stream in such an instance should be protected from air prior to use in the present process.

A preferred way of lowering the oxygen content in the aqueous stream to the level indicated hereinabove is to sparge the stream with a gas such as nitrogen, argon, helium or carbon dioxide which is inert, that is, inert in the sense that it does not react with the reducing radical present in the aqueous stream. When this method is used in the present invention, it is important to utilize inert gases which have a very low oxygen content.

Sparging is typically carried out in the present invention by bubbling an inert gas in the aqueous stream using conditions that are well known to those skilled in this art. To illustrate sparging conditions useful in the present invention, when sparging was conducted in a batch mode using a closed stirred tank reactor stirred at 550 rpm, sparging with nitrogen having a flow rate from about 0.2 L/min. to about 0.5 L/min achieved about a 2 to 4 fold decrease in the concentration of oxygen in the aqueous stream in about 2 hours. One of ordinary skill in this art will recognize how to scale up to larger-scale operations the conditions found to be successful on a smaller test scale. It should be emphasized that other sparging conditions for continuous mode operation may also be used in the present invention.

Figure 1:
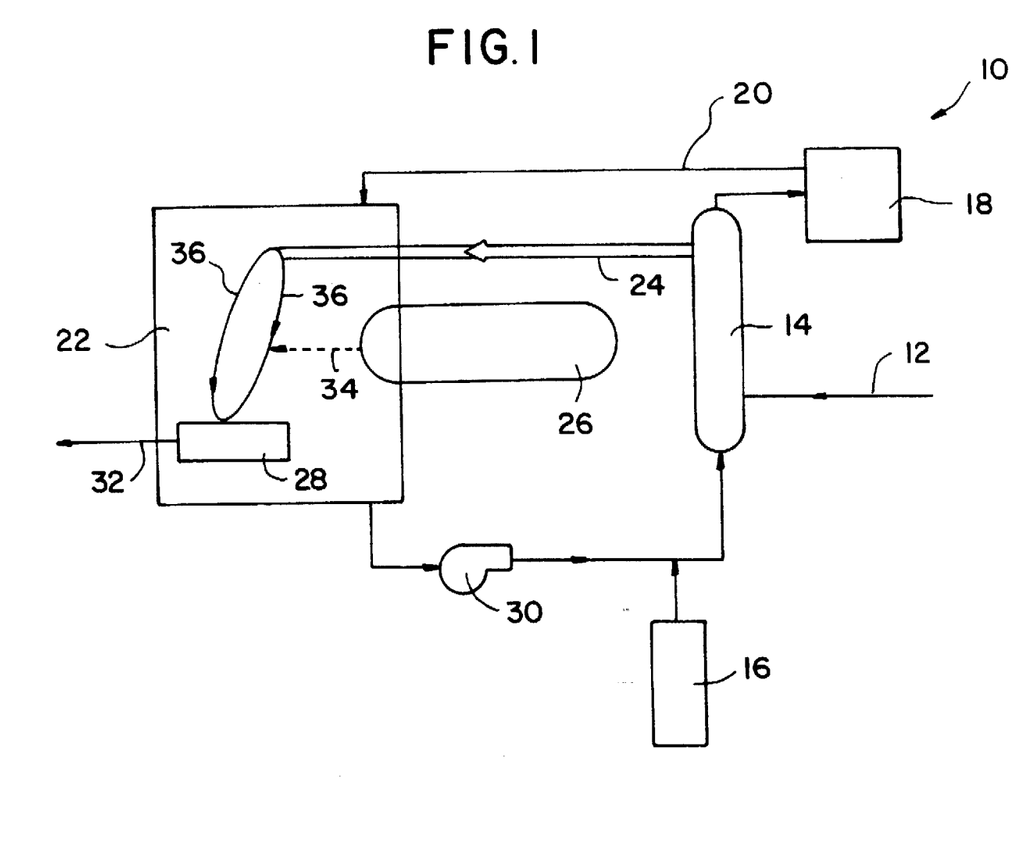
FIG. 1 is a schematic illustrating one possible embodiment of the present invention which utilizes an electron beam apparatus for generating electrophilic free radicals.

Reference is now made to FIG. 1 which represents one possible application of the present invention using electron beam treatment. A water treatment system 10 containing an inlet pipe 12 for transferring an oxygenated aqueous stream containing at least one electron affinic contaminant into sparging tower 14 is provided. The aqueous stream also contains at least one of the above-mentioned reducing radical precursors in an amount which is sufficient to compete with the other components in the aqueous stream for any free radicals present in the stream. Oxygen-free nitrogen from tank 16 is provided to sparging tower 14. During the course of sparging, removed $O_2$ and added $N_2$ is transferred to oxygen removal chamber 18. The $O_2$ is then removed from the gas in chamber 18 and purified $N_2$ is recirculated through pipe 20 to housing 22.

Deoxygenated water from sparging tower 14 is transferred through pipe 24 to housing unit 22 which also contains, in this figure, a portion of electron beam apparatus 26 and collector 28. It should be noted that the entire electron beam apparatus 26 may be contained in housing unit 22 or it can be outside the housing unit. If the electron beam apparatus is outside housing unit 22 the unit must contain a window which allows penetration of the electron beam into the housing unit. Nitrogen is continuously provided through pipe 20 to housing unit 22 and is recirculated through recirculating pump 30. It should be noted that recirculating pump 30 need not be present in water treatment system 10.

In accordance with the practice of the present invention, the deoxygenated aqueous stream 36 from pipe 24 is subjected to electron beam treatment by exposing the same to an electron beam 34 from electron beam apparatus 26. The energy of the electron beam is sufficient to cause electrophilic free radicals to form in the aqueous stream 36. Since the aqueous stream 36 already contains a sufficient amount of a reducing radical precursor, the generated electrophilic free radicals will react with the reducing agent to produce a reactive intermediate. Moreover, since the oxygen concentration in the stream is below the critical level stated above, oxygen will not scavenge the reactive intermediate produced in-situ, thus the intermediate will rapidly react with the electron affinic contaminant reducing the same to a less toxic substance which is collected in collector 28. The treated water then exits collector 28 through pipe 32 and can be used as desired.

As stated herein, the present invention provides an improved process for removing electron affinic contaminants from waste water and groundwater. Specifically, by utilizing the process of the present invention, contaminants may be removed to any desired level from the aqueous stream provided.

It should be emphasized that other contaminants present in the aqueous stream which do not contain electron- withdrawing groups may also be removed since there is a sufficient amount of electrophilic free radicals present in the aqueous stream to remove those types of contaminants by oxidization.

Hence, the present invention represents a dramatic improvement over prior art free radical treatment processes since it efficiently removes electron affinic contaminants which are difficult to oxidize while still being able to remove contaminants that are readily oxidized using electrophilic free radical treatment processes. Moreover, since waste water or groundwater may contain the aforementioned reducing radical precursors therein, the present invention, in a preferred embodiment, requires no extra chemicals besides the reducing radical precursor to reduce the electron affinic contaminants. Therefore, the present invention provides a more cost-effective means for removing difficult to oxidize contaminants, i.e., electron affinic contaminants, as well as easily oxidizing contaminants than heretofore known.

The following examples are given to illustrate the scope of the present invention. Because these examples are given for illustration purposes only, the invention embodied therein should not be limited thereto.

EXAMPLE 1

Improved Destruction of Nitrated Ordnance Compounds

Figure 2:
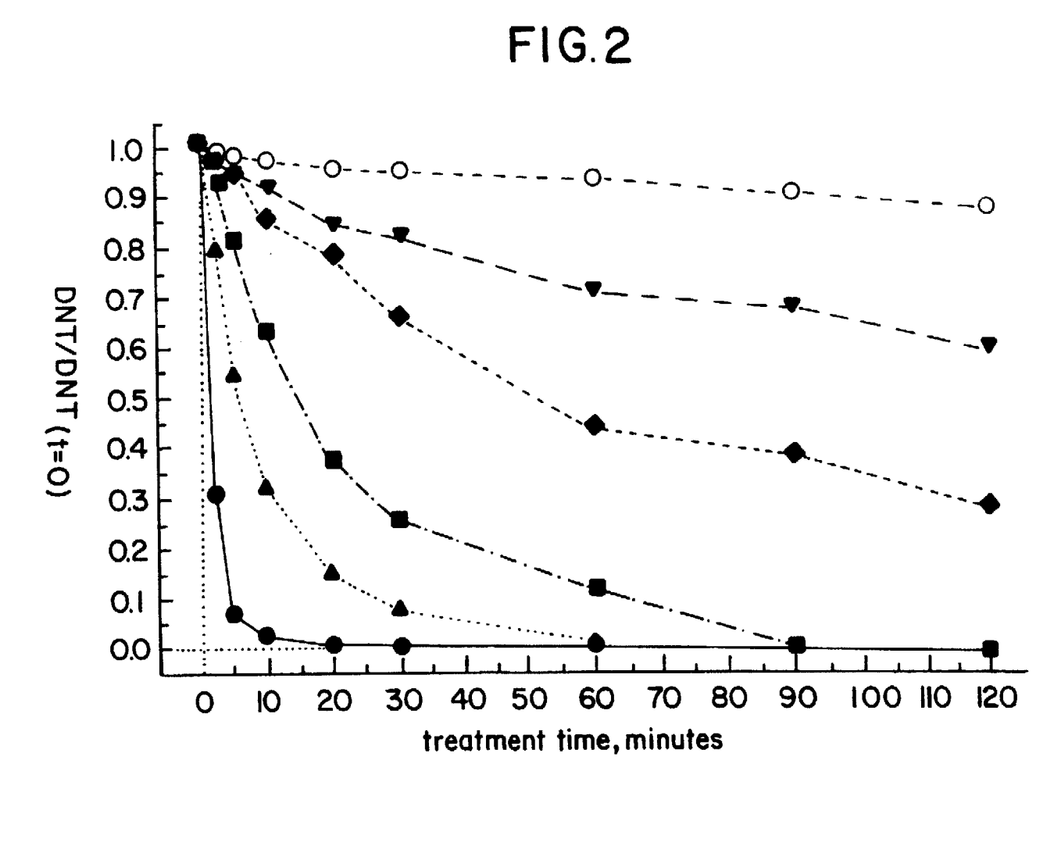

Experiments were conducted in which hydroxyl radicals were produced in-situ by photolysis of hydrogen peroxide using a commercially available low-pressure mercury lamp, in solutions that were maintained at various oxygen concentrations by sparging with different oxygen/nitrogen mixtures. These experiments were carried out using dinitrotoluene (DNT) in aqueous ethanol solution, in order to mimic the wastewater from the manufacture of DNT. The experiments verified that destruction of DNT by a hydroxyl radical-generating process was greatly improved by the removal of oxygen from the system, in this case by rapid bubbling of nitrogen through the solution before and during treatment. The results are shown in FIG. 2, in the form of disappearance curves for DNT (initial concentration $2.5 \times 10^{-5}$ molar or 4.6 mg/L, nominal) treated in the presence of ethanol (initial concentration 0.5 molar or 23 g/L nominal: a 5,000-fold excess over that of DNT). The dissolved oxygen (DO) concentrations were measured using a DO meter. Removal of DNT was very slow when the solution was sparged with pure oxygen (top curve), but increased as the oxygen content decreased, until removal was 230 times faster in the nitrogen-sparged experiment (bottom curve), in which approximately $6 \times 10^{-6}$ molar oxygen (0.2 ppm) was still present. In many free-radical treatment systems, this increase in removal rate translates almost directly into treatment cost reductions of similar magnitude. The experiment in which the aqueous oxygen concentration was 2.5 mg/L used a sparge gas mixture that was 21% oxygen which is similar to the composition of air. The resulting oxygen concentration is lower than that of water that is in equilibrium with air because of rapid oxygen consumption by reaction with ethanol radical, indicating that the additive can be used to promote or speed up oxygen depletion of the solution. This point is further illustrated in the second example.

EXAMPLE 2

Improved Destruction of Halogenated Compounds

Figure 3:
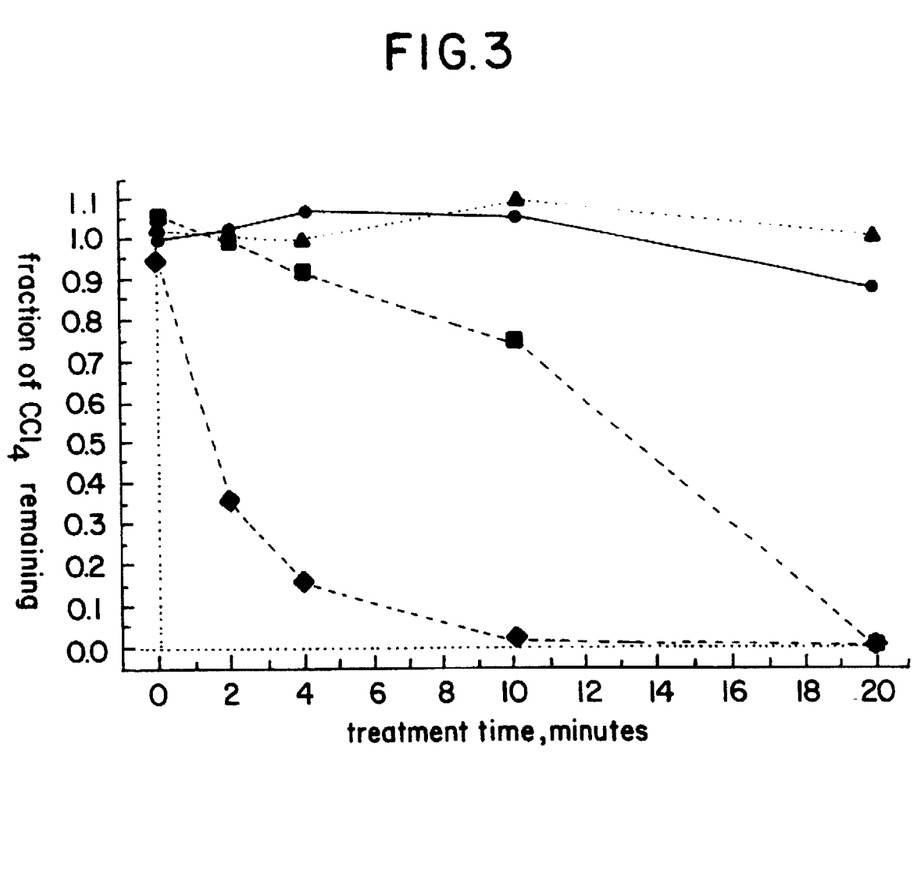
FIG. 3 illustrates the effect of ethanol addition and oxygen removal for the destruction of $CCl_4$ in water using a $H_2O_2$/UV free radical treatment process. In this figure, ▲ denotes no ethanol, nitrogen sparged solution; ▲ denotes no ethanol, oxygen sparged solution; ■ denotes ethanol added, oxygen sparged solution; and ♦ denotes ethanol added, nitrogen sparged solution.

Experiments were performed on portions of four solutions that were prepared as follows:

I) 0.15M $H_2O_2$, no ethanol, sparged with oxygen; denoted as ● in FIG. 3.

II) 0.15M $H_2O_2$, no ethanol, sparged with nitrogen; denoted as ▲ in FIG. 3.

III) 0.15M $H_2O_2$, 0.16M ethanol, sparged with oxygen; denoted as ■ in FIG. 3.

IV) 0.15M $H_2O_2$, 0.16M ethanol, sparged with nitrogen; denoted as ♦ in FIG. 3.

To these solutions was added 0.14±0.02 micromolar (22±3 micrograms/L) carbon tetrachloride from a concentrated aqueous stock solution. Gas sparging was performed prior to $CCl_4$ addition to avoid sparging of the carbon tetrachloride from solution. The solutions were then carefully (to avoid significant out-gassing of carbon tetrachloride) poured into 44-mL glass vials and septum-capped headspace-free until use. The individual experiments were performed by opening a vial and converting it to a photochemical reactor by inserting a small ultraviolet "pen lamp" fitted tightly into a hole in a septum. Hydroxyl radicals were produced by photolysis of the added hydrogen peroxide, using the low-pressure mercury lamp. Solutions were photolyzed for 2, 4, 10 and 20 minutes, then analyzed, along with unphotolyzed control samples, for carbon tetrachloride by microextraction/gas chromatography using an electron capture detector.

Experimental results are shown in FIG. 3, as fraction of carbon tetrachloride remaining after the different treatment intervals. Data shown are the average of results for three vials, for each of which, three injections into the GC were made. Essentially no carbon tetrachloride removal was observed when ethanol was not present. Addition of ethanol to the oxygen-sparged solutions resulted in slow removal over the first 10 minutes of photolysis, with the rate increasing as oxygen was depleted from solution. Addition of ethanol to the solution from which the oxygen had been removed resulted in the rapid destruction of carbon tetrachloride upon photolysis. These results are supportive of the role of ethanol as both precursor to the reducing radical and as an additive to promote oxygen removal.

It is clear from the above data that ethanol addition improved carbon tetrachloride removal, but that the greatest improvement was observed when both oxygen removal (nitrogen sparging) and ethanol addition were used.

The above preferred embodiments and examples are given to illustrate the scope and spirit of the present invention. These embodiments and examples will make apparent to those skilled in the art other embodiments and examples. These other embodiments and examples are also within the contemplation of the instant invention. Therefore, the present invention should be limited only by the appended claims.

What is claimed is:

1. A process for treating an aqueous stream for the removal of contaminants therefrom, said process comprising:

(1) providing an aqueous stream containing (a) at reducing radical precursor which preferentially competes with other components present in said aqueous stream for reaction with the electrophilic free radical generated in step (2); and (2) generating an electrophilic free radical which is capable of reacting with said reducing radical precursor to produce a reactive intermediate while maintaining the oxygen content of said aqueous stream at zero or at no higher than about 8 mg per liter, wherein said oxygen content is insufficient to permit reaction of said oxygen with said reactive intermediate;

under conditions effective to cause said electrophilic free radical to react with said reducing radical precursor to produce said reactive intermediate and effective to cause said reactive intermediate to react with said electron affinic contaminant, whereby said electron affinic contaminant is converted to a reduced product.

2. The process of claim 1 wherein said electron affinic contaminant is an inorganic compound, an organic compound or a mixture thereof.

3. The process of claim 2 wherein said electron affinic contaminant contains at least one electron-withdrawing substituent.

4. The process of claim 3 wherein said electron-withdrawing substituent is a nitro, a halide, a sulfonate, a carboxylate, a nitrile, a nitrate ester, a carboxylate ester, a nitrite ester, a nitroso, a carbonyl, or a quaternary ammonium substituent.

5. The process of claim 4 wherein said nitro-containing contaminant is dinitrotoluene, trinitrotoluene, dinitrobenzene or trinitrobenzene.

6. The process of claim 5 wherein said nitro-containing contaminant is dinitrotoluene trinitrobenzene or trinitrotoluene.

7. The process of claim 4 wherein said halide-containing contaminant is a saturated halogenated aliphatic hydrocarbon compound, an unsaturated halogenated aliphatic or aromatic hydrocarbon compound, a polychlorinated biphenyl compound, a polybrominated biphenyl compound, a halogenated dioxin or furan, a halogenated-containing pesticide, or a drinking water disinfection by-product.

8. The process of claim 7 wherein said saturated halogenated compound is carbon tetrachloride, dichloromethane, chloroform, bromodichloromethane, chloroethane, dibromochloromethane, dichlorodifluoromethane, 1,1-dichloroethane, 1,2-dichloroethane, 1,2-dichloropropane, 1,1,2,2-tetrachloroethane, 1,1,1-trichloroethane, carbon tetrabromide, dibromomethane, bromomethane, 1,1-dibromoethane, 1,2-dibromoethane or trichlorofluoromethane.

9. The process of claim 8 wherein said saturated halogenated compound is carbon tetrachloride.

10. The process of claim 7 wherein said unsaturated halogenated compound is 1,1,2-trichloroethylene, 1,2-dichloroethylene, perchloroethylene, chlorinated phenols, 1,1-dichloroethene, trans-1,2-dichloroethene, cis and trans-1,3-dichloropropene or 1,1,2-tribromoethylene, 1,2-dibromoethylene, brominated phenols, 1,1-dibromoethene or vinyl chloride.

11. The process of claim 7 wherein said drinking water disinfection by-product is a trihalomethane, a haloacetic acid or a haloacetonitrile.

12. The process of claim 7 wherein chlorine-containing pesticide is decachlorooctahydro-1,3,4-metheno-2-H-cyclobuta[cd]pentalene-2-one; 1,2,3,4,5,6-hexachlorocyclohexane; dodecachlorooctahydro-1,3,4-metheno-1H-cyclobuta[cd]-pentalene; 1,2-dibromo-2,2-dichloroethyldimethyl phosphate; O,O-dimethyl-O (2,4,5-trichlorophenyl) phosphorothioate; 4-tert-butyl-2-chlorophenyl-O-methyl methylphosphoroamidate; S-(2-chloro-phthalimido-ethyl) O,O diethyl phosphorodithioate; chlorinate camphene; S-[[p-chlorophenyl)thio]methyl] O,O-diethyl phosphorodithioate, O-[2-chloro-1-(2,5-dichlorophenyl)-vinyl] O,O-diethyl phosphorothioate; 1,2,3,4,10,10-hexachloro-1,4,4a,5,8,8a-hexahydro-1,4-endo-exo-5,8-dimethylanonaphthalene; O,O-diethyl(2,2,2-trichloro-1-hydroxylethyl)phosphonate; 6,7,8,9,10,10-hexachloro-1,5,5a,6,9,9a-hexahydro-6,9-methano-2,4,3-benzodioxathiepin-3-oxide; 1,2,3,4,10,10-hexachloro-6,7-epoxy-1,4,4a,5,6,7,8,8a-octahydro-1,4-endo-endo-5,8- dimethanonaphthalene, 1,1,1-trichloro-2,2-bis(p-chlorophenyl) ethane; 1,1,-dichloro-2,2-bis(p-chlorophenyl) ethane; 1,1-dichloro-2,2-bis(p-chlorophenyl) ethene; 2,2-bis (p-methoxyphenyl)-1,1,1-trichloroethane; O-O-bis(p-chlorophenyl) acetimidoylphosphoramideothioate; 2,4-dichlorophenyl p-nitrophenyl ether; α,α-bis(p-chlorophenyl)-3-pyridine methanol; 1,1-dichloro-2,2-bis(p-ethylphenyl) ethane; O-(4-bromo-2,5-dichlorophenyl); O-methylphenyl-phosphonothioate or 4' chlorophenyl 2,4,5-trichlorophenyl sulfone.

13. The process of claim 1 wherein said electrophilic free radicals are hydroxyl radicals, hydrogen atoms or sulfate radicals.

14. The process of claim 13 wherein said electrophilic free radicals are hydroxyl radicals.

15. The process of claim 14 wherein said electrophilic free radicals are produced from free radical treatment processes.

16. The process of claim 15 wherein said electrophilic free radicals are generated by treatment of said aqueous stream with ozone or binary or ternary combinations of ozone, hydrogen peroxide and ultraviolet light; semiconductor-catalyzed photooxidation; Fenton's reagent variants; treatment with ionizing radiation; sonication/cavitation; thermal, radiation, or photochemical decomposition of peroxide or persulfate compounds; or UV or vacuum UV photolysis.

17. The process of claim 16 wherein said ionizing radiation is generated from electron beams gamma rays, UV, vacuum UV or photo-Fenton's variants.

18. The process of claim 16 wherein said electrophilic free radicals are generated by treatment of said aqueous stream with hydrogen peroxide and ultraviolet light.

19. The process of claim 1 wherein said reducing radical precursor is an alcohol, an aldehyde, formic acid, an inorganic salt of formic acid or carbon dioxide.

20. The process of claim 19 wherein said reducing radical precursor is an aliphatic or aromatic alcohol containing from about 1 to about 8 carbon atoms.

21. The process of claim 20 wherein said aliphatic or aromatic alcohol contains from about 1 to about 6 carbon atoms.

22. The process of claim 21 wherein said alcohol is ethanol or methanol.

23. The process of claim 19 wherein said reducing radical precursor is formic acid or an inorganic salt thereof.

24. The process of claim 1 wherein said reducing radical precursor is present in said aqueous stream in a concentration of no less than about 0.01 mg/L.

25. The process of claim 24 wherein said reducing radical precursor is present in said aqueous stream in a concentration of from about 0.1 to about 50,000 mg/L.

26. The process of claim 25 wherein said reducing radical precursor is initially present in said aqueous stream as a contaminant or is separately added thereto.

27. The process of claim 26 wherein said reducing radical precursor is initially present in said aqueous stream as a contaminant.

28. The process of claim 1 wherein said oxygen content is from about 0.1 to about 2 mg per liter.

29. The process of claim 28 wherein said oxygen concentration is obtained by chemical treatment of said aqueous stream or by sparging said aqueous stream with an inert gas.

30. The process of claim 29 wherein said oxygen concentration is obtained by sparging.

31. The process of claim 30 wherein said sparging is carried out by utilizing nitrogen gas or carbon dioxide.

32. The process of claim 29 wherein said aqueous stream is chemically treated with sulfite or sulfur dioxide.

* * * * *

UNITED STATES PATENT AND TRADEMARK OFFICE
CERTIFICATE OF CORRECTION

PATENT NO. : 5,762,808
DATED : June 9, 1998
INVENTOR(S) : Gary Rodger Peyton

It is certified that error appears in the above-identified patent and that said Letters Patent is hereby corrected as shown below:

Column 1,
Line 7: "DACA-88-93-..." should read -- DACA-88-83-... --

Column 3,
Line 58: "△" should read -- ○ --

Column 6,
Line 3: "0" should read -- ○ --

Signed and Sealed this

Eighteenth Day of September, 2001

Attest:

NICHOLAS P. GODICI
*Attesting Officer*   *Acting Director of the United States Patent and Trademark Office*